United States Patent
Staubach et al.

(10) Patent No.: US 12,152,532 B2
(45) Date of Patent: Nov. 26, 2024

(54) SPLIT EVAPORATOR FOR STEAM INJECTION TURBINE ENGINE

(71) Applicant: RTX CORPORATION, Farmington, CT (US)

(72) Inventors: Joseph B. Staubach, Colchester, CT (US); Neil J. Terwilliger, Cheshire, CT (US); Joseph E. Turney, Amston, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/486,362

(22) Filed: Oct. 13, 2023

(65) Prior Publication Data
US 2024/0254914 A1 Aug. 1, 2024

Related U.S. Application Data

(60) Provisional application No. 63/441,511, filed on Jan. 27, 2023.

(51) Int. Cl.
| | |
|---|---|
| *F02C 3/30* | (2006.01) |
| *F02C 3/14* | (2006.01) |
| *F02C 3/22* | (2006.01) |
| *F02C 7/14* | (2006.01) |

(52) U.S. Cl.
CPC .................. *F02C 3/30* (2013.01); *F02C 3/22* (2013.01); *F02C 7/14* (2013.01); *F05D 2220/323* (2013.01); *F05D 2260/213* (2013.01); *F05D 2270/08* (2013.01)

(58) Field of Classification Search
CPC ........ F01K 23/06; F01K 23/10; F01K 23/101; F01K 23/103; F01K 23/105; F01K 23/106; F01K 23/108; F01D 25/32; F02C 3/30; F02C 3/305; F02C 7/12; F02K 3/00; F02K 3/02; F02K 3/025; F02K 3/04; F02K 3/06; F02K 3/068; F02K 3/077; F02K 3/08; F02K 3/105; F02K 3/115

See application file for complete search history.

(56) References Cited

U.S. PATENT DOCUMENTS

| | | | | |
|---|---|---|---|---|
| 4,062,184 A | * | 12/1977 | Hagen | F02C 3/22 60/39.282 |
| 5,797,259 A | * | 8/1998 | Nielsen | F22B 21/26 60/39.182 |
| 5,826,430 A | * | 10/1998 | Little | F01K 23/10 60/736 |

(Continued)

FOREIGN PATENT DOCUMENTS

WO 2020187345 A1 9/2020

*Primary Examiner* — Alain Chau
*Assistant Examiner* — Sean V Meiller
(74) *Attorney, Agent, or Firm* — Carlson, Gaskey & Olds, P.C.

(57) ABSTRACT

A turbine engine assembly includes a condenser assembly arranged along the core flow path to extract water from the exhaust gas flow, and an evaporator assembly where thermal energy from the exhaust gas flow is communicated to the water extracted by the condenser assembly to generate a steam flow for injection into the core flow path. The evaporator assembly splits steam generation and cooling functions to increase efficiencies of each function.

17 Claims, 4 Drawing Sheets

(56) References Cited

U.S. PATENT DOCUMENTS

| | | | |
|---|---|---|---|
| 6,293,086 B1* | 9/2001 | Reynolds | F02C 6/18 |
| | | | 60/39.55 |
| 8,726,663 B2* | 5/2014 | Schroder | F22B 1/1815 |
| | | | 60/39.15 |
| 2021/0207500 A1* | 7/2021 | Klingels | F01K 23/10 |

* cited by examiner

SPLIT EVAPORATOR FOR STEAM INJECTION TURBINE ENGINE

CROSS REFERENCE TO RELATED APPLICATION

This application claims priority to U.S. Provisional Application Ser. No. 63/441,511 filed on Jan. 27, 2023.

STATEMENT REGARDING FEDERALLY SPONSORED RESEARCH OR DEVELOPMENT

This invention was made with Government support under Contract DE-AR0001561 awarded by the United States Department of Energy, Office of ARPA-E. The Government has certain rights in this invention.

TECHNICAL FIELD

The present disclosure relates generally to a steam injected aircraft propulsion system and, more particularly to an evaporator for producing a steam flow for injection.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to the atmosphere. The lost heat reduces the overall efficiency of the engine.

Lost heat can be utilized to generate a steam flow from water recovered from the exhaust gas flow. The steam can be injected into the core flow stream to increase mass flow and thereby increase energy efficiency. Transformation of the water to steam is provided by an evaporator. The evaporator also provides for cooling of the exhaust gas flow to aid in condensation. Accordingly, evaporator operation impacts improvements in engine efficiency provided by steam injection.

SUMMARY

A turbine engine assembly according to an example embodiment of this disclosure includes, among other possible things, a core engine including a core flow path where air is compressed in a compressor section, communicated to a combustor section, mixed with fuel, and ignited to generate an exhaust gas flow that is expanded through a turbine section, a condenser assembly arranged along the core flow path to extract water from the exhaust gas flow, and an evaporator assembly where thermal energy from the exhaust gas flow is communicated to the water extracted by the condenser assembly to generate a steam flow for injection into the core flow path. The evaporator assembly includes a first inlet for a first flow of water and a second inlet for a second flow of water upstream of the first inlet.

In another example embodiment of the foregoing turbine engine assembly, a spacing between a last stage of the turbine section and the first inlet is greater than a spacing between the last stage of the turbine section and the second inlet.

In another example embodiment of any of the foregoing turbine engine assemblies, evaporator includes a first outlet and a second outlet, wherein the second outlet is upstream of the first outlet and a flow of water from the first outlet is combined with the second flow of water communicated to the second inlet.

In another example embodiment of any of the foregoing turbine engine assemblies, further includes at least one heat load upstream of a flow of water from the second inlet where the second water flow is preheated before entering the evaporator assembly.

In another example embodiment of any of the foregoing turbine engine assemblies, the second flow of water into the evaporator is a higher temperature than the first inlet flow of water in the evaporator.

In another example embodiment of any of the foregoing turbine engine assemblies, the steam temperature exiting the evaporator assembly is between 550 and 1500 F.

In another example embodiment of any of the foregoing turbine engine assemblies, an intercooler upstream of the second inlet where the preheated second water flow is cooled prior to entering the evaporator assembly.

In another example embodiment of any of the foregoing turbine engine assemblies, the evaporator assembly includes a first evaporator portion disposed upstream of a turbine section and a second evaporator portion disposed downstream of a turbine section.

In another example embodiment of any of the foregoing turbine engine assemblies, the turbine section includes a first turbine and a second turbine and the first evaporator assembly is disposed between the first turbine and the second turbine and the second evaporator assembly is disposed after the second turbine.

In another example embodiment of any of the foregoing turbine engine assemblies, the condenser assembly includes a condenser portion where water from the exhaust gas flow is condensed into a liquid and a water separator where the liquid is separated from the exhaust gas flow.

In another example embodiment of any of the foregoing turbine engine assemblies, at least a portion of water extracted by the condenser assembly is communicated to a location upstream of the combustor.

In another example embodiment of any of the foregoing turbine engine assemblies, at least a portion of the steam flow is injected into the combustor section.

In another example embodiment of any of the foregoing turbine engine assemblies, including a hydrogen fuel system suppling hydrogen fuel to the combustor through a fuel flow path.

A turbine engine according to another example disclosed embodiment includes, among other things, a core engine including a core flow path where air is compressed in a compressor section, communicated to a combustor section, mixed with fuel, and ignited to generate an exhaust gas flow that is expanded through a turbine section, a hydrogen fuel system suppling hydrogen fuel to the combustor through a fuel flow path, a condenser assembly arranged along a core flow path to extract water from exhaust flow, and an evaporator assembly where thermal energy from the exhaust gas flow is communicated to the water extracted by the condenser assembly to generate a steam flow for injection into the core flow path. The evaporator assembly including a first water heating circuit for heating a first water flow and a second water heating circuit for transforming a second water flow into a steam flow.

In another example embodiment of any of the foregoing turbine engine assemblies, the first water heating circuit is located downstream further from the combustor than the second water circuit.

In another example embodiment of any of the foregoing turbine engine assemblies, including at least one heat load where a second water flow is preheated before entering the second heating circuit of the evaporator assembly.

In another example embodiment of any of the foregoing turbine engine assemblies, the evaporator assembly includes a first evaporator portion disposed aft of a last portion of the turbine section and a second evaporator portion disposed forward of at least one portion of the turbine section, the second water heating circuit disposed in the second evaporator portion and the first water circuit disposed in the first evaporator portion.

A method of generating a steam flow in a turbine engine assembly according to another disclosed example embodiment includes, among other possible things, extracting water from an exhaust gas flow, communicating a first flow of the extracted water to a first heating circuit of an evaporator exposed to the exhaust gas flow, communicating a second flow of the extracted water to a second heating circuit of an evaporator exposed to the exhaust gas flow, wherein the second heating circuit is in a hotter portion of the exhaust gas flow, directing heated water flow from the first heating circuit into the second heating circuit, heating the water flow in the second heating circuit to generate a steam flow, and communicating the generated steam flow to a core flow path of the turbine engine.

In another example disclosed embodiment of the foregoing method, the first flow in the first circuit generates steam and the second heating circuit generates a superheated steam flow.

Another example disclosed embodiment of any of the foregoing methods includes heating the second flow of extracted water with at least one heat load to preheat the second flow prior to entering the evaporator.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
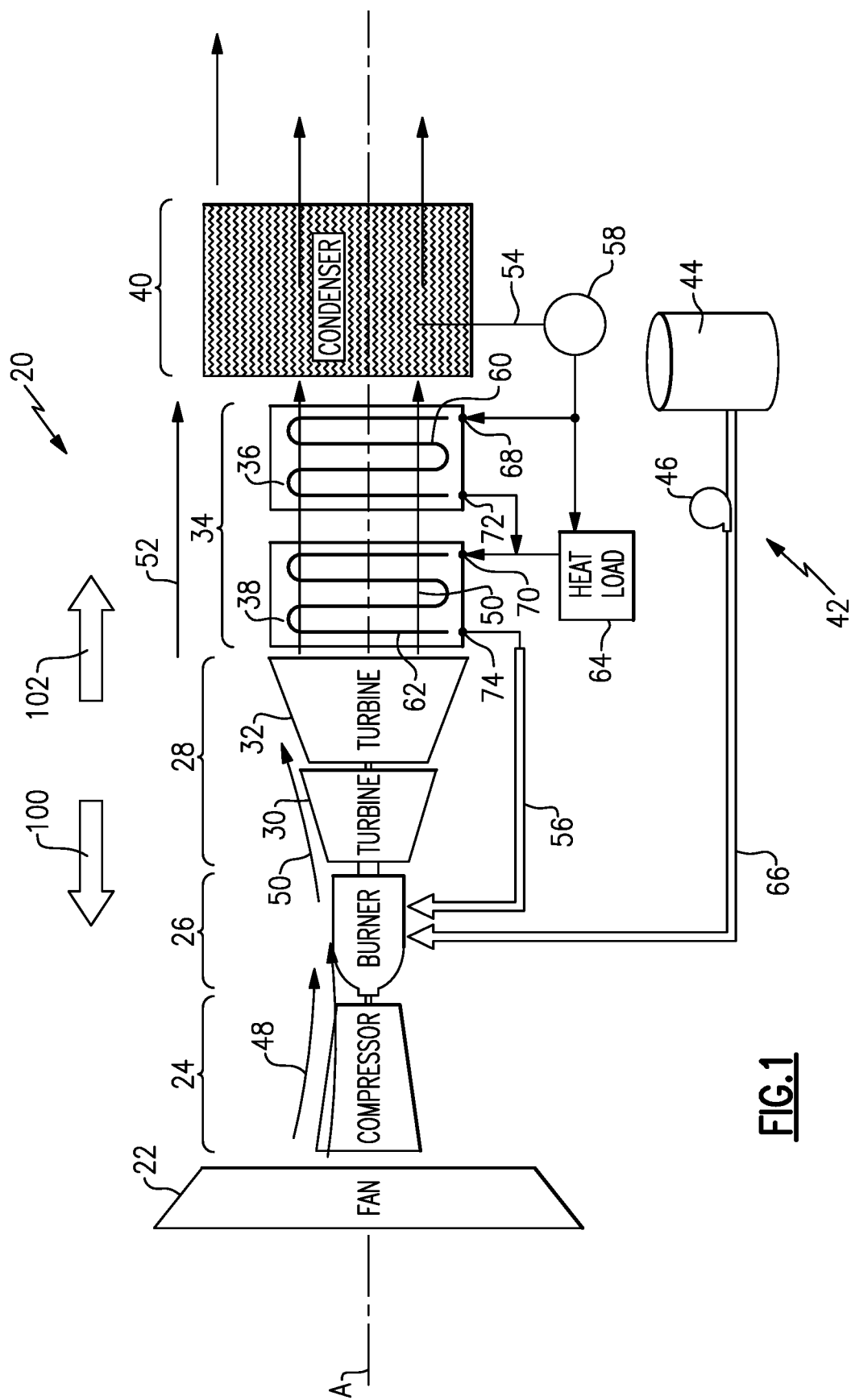
FIG. 1 is a schematic view of an example propulsion system embodiment.

FIG. 1 schematically illustrates an example hydrogen steam injected turbine engine that is generally indicated at 20. The disclosed turbine engine 20 includes an evaporator assembly 34 to efficiently utilize heat from an exhaust gas flow 50 to generate a steam flow injected into a combustor 26. The evaporator assembly 34 splits steam generation and cooling functions to increase efficiencies of each function.

The engine 20 includes core engine with a core flow path through a fan 22, a compressor section 24, the combustor 26 and a turbine section 28. The fan 22 drives inlet air as a core flow 48 into the compressor section 24. In the compressor section 24, the core flow 48 is compressed and communicated to the combustor 26. In the combustor 26, the core flow 48 is mixed with a fuel flow 66 and ignited to generate a high energy gas flow 50 that expands through the turbine section 28 where energy is extracted and utilized to drive the fan 22 and the compressor section 24. A bypass flow 52 may flow through the fan 22 and bypass the remaining components of the engine 20.

The engine 20 is configured to burn a non-carbon based fuel to reduce engine emissions. In one disclosed example, the fuel is hydrogen based and provided by a fuel system 42. The example fuel system 42 includes a liquid hydrogen ($LH_2$) tank 44 in communication with at least one pump 46. The pump 46 drives the fuel flow 66 to the combustor 26. Although hydrogen is disclosed by way of example, other fuels could be utilized within the contemplation of this disclosure.

A steam flow 56 from an evaporator assembly 34 is injected into the core air flow at or upstream of the combustor 26. The steam flow 56 increases mass flow through the turbine section 28 to improve engine efficiency.

The high energy gas flow 50 is exhausted from the turbine section 28 and communicated to an evaporator assembly 34 and a water recovery assembly 40 before being exhausted to the atmosphere. The evaporator assembly 34 functions to generate the steam flow 56 from water recovered from the exhaust gas flow 50. The evaporator 34 further provides cooling of the exhaust gas flow 50 to aid in condensation of liquid from the exhaust gas flow 50. The evaporator assembly is hottest at the upstream most portion adjacent the aft end of the turbine section 28. The coolest portion of the evaporator assembly 34 is that portion that is furthest or downstream from the turbine section 28. The example evaporator assembly 34 advantageously routes water flow relative to the hottest and coolest portions to maximize both the cooling and heating functions.

Upstream as utilized in this disclosure is in a direction indicated by arrow 100 toward the fan section 22 and counter to the core flow 48. Downstream as utilized in this disclosure is in the direction indicated by arrow 102 toward the water recovery assembly 40 and in the same direction as the core flow 48 and exhaust gas flow 50.

The water recovery assembly 40 draws water, schematically indicated at 54, from the high energy gas flow 50 and communicates the recovered water to water storage tank 58. The water storage tank 58 operates as an accumulator to provide sufficient water for operation during various engine operating conditions. The water flow 54 is split between a first evaporator portion 36 downstream from a second evaporator portion 38. The positions of the first evaporator portion 36 and the second evaporator portion 38 relative to the turbine section 28 provide for the second evaporator 38 to be much hotter than the first evaporator 36.

The first evaporator portion 36 includes a first inlet 68 to a first water heating circuit 60 and the second evaporator portion 38 includes a second inlet 70 to a second water heating circuit 62. Heated water and/or steam is exhausted through a first outlet 72 after being heated in the first evaporator portion 36. Steam 56 is exhausted from a second outlet 74 after being heated in the second evaporator portion 38. In one disclosed example, the steam temperature exiting the evaporator assembly is between 550 and 1500 F. The steam 56 is communicated to the combustor 26.

Water directed to the second evaporator portion 38 is first routed to cool a heat load 64 where the water is preheated. The relatively cool water from the water recovery assembly 40 provides for cooling the heat load 64 before being communicated to the second evaporator portion 38. The heat load 64 is shown schematically and would include a heat exchanger associated with an engine or aircraft system that required cooling. Such heat loads can include electrical components, cooling air systems, lubrication system and any other system or flow that requires cooling. The heat load 64 would include an applicable heat exchanger that is configured to reject heat into the water flow.

Preheated water from the first water heating circuit 60 of the first evaporator portion 36 is also combined with water flow to the second evaporator portion 38. The preheated water communicated to the second evaporator portion 38 provides more efficient transformation into steam.

Figure 2:
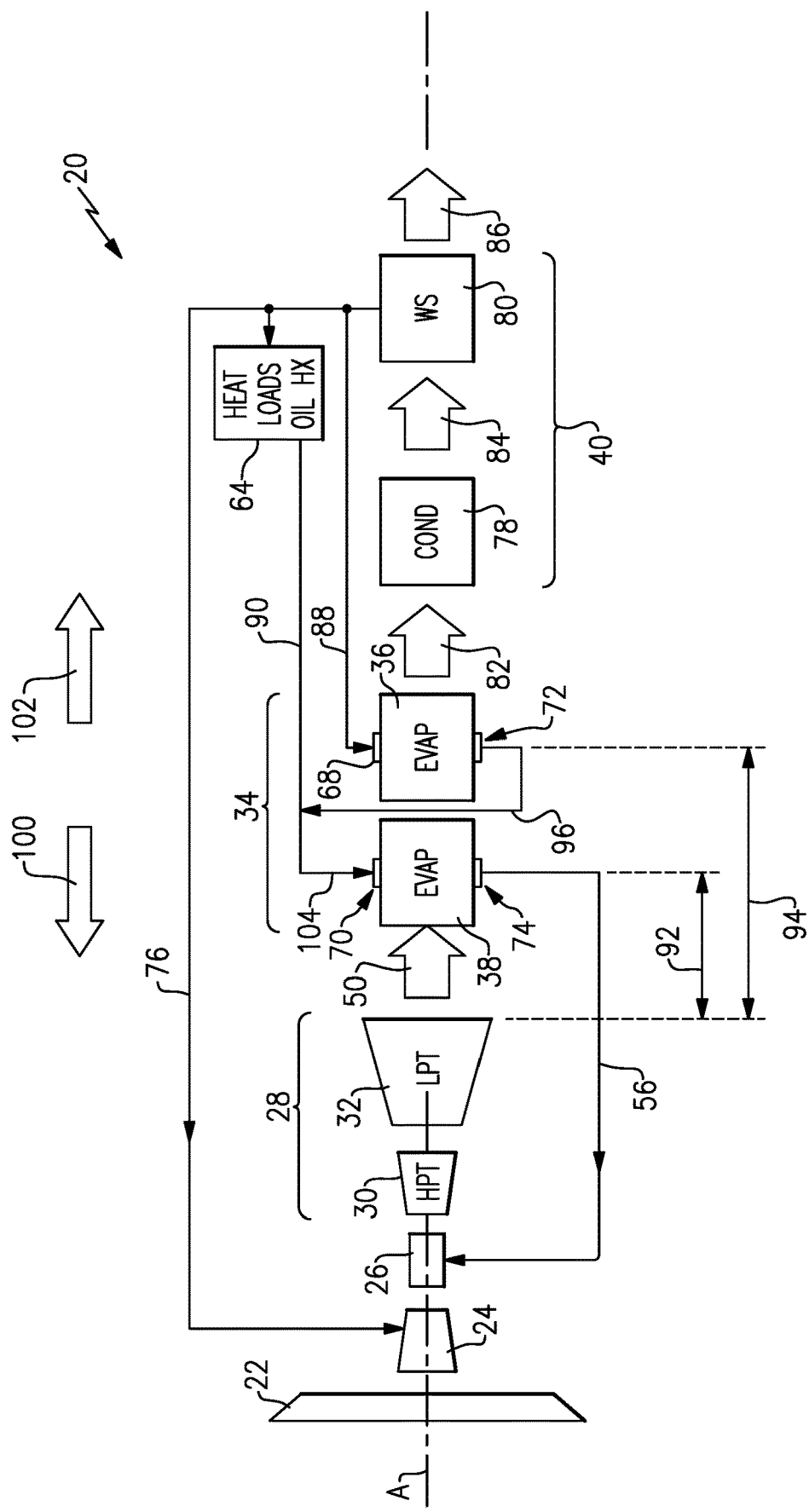
FIG. 2 is a schematic view of another example propulsion system embodiment.

Referring to FIG. 2, with continued reference to FIG. 1, a first water flow 88 is communicated to the inlet 68 of the first evaporator 36. The first water flow 88 is heated and exhausted as a preheated water flow indicated at 96. The preheated water flow 96 is combined with a second water flow 90 that is first routed to cool the first heat load 64. Accordingly, the second water flow 90 is already warmed and is combined with the preheated water 96 from the first evaporator portion 36. The second water flow 90 and the preheated water flow 96 are combined and communicated through the second inlet 70 into the hotter second evaporator portion 38.

Heat rejection from the exhaust gas flow 50 into the second evaporator section 38 provides for lower core flow temperatures into the first evaporator section 36. In this disclosed example, the first evaporator portion 36 is spaced apart from the turbine section 28 a distance 94. The second evaporator portion 38 is spaced apart from the turbine section 28 a distance 92 that is less than the first distance 94. The different distances correspond to the different operating temperatures of each evaporator portion 36, 38.

The exhaust gas flow 50 is first flowed through the second evaporator portion 38 where it is cooled by rejecting heat into the combined water flow to generate steam. The cooler gas flow from the second evaporator 38 is communicated to the first evaporator 36 where it is further cooled to generate a cooled exhaust gas flow 82 that is communicated to a condenser 78 of the water recovery assembly 40. In the condenser 78, the cooled exhaust gas flow 82 is further cooled to extract liquid water and is communicated as a liquid/gas flow 84 to a water separator 80. The water separator 80 extracts water and expels the remaining portion of the exhaust gas flow as indicated at 86. The water flow from the water separator 80 is split into the first water flow 88 and the second water flow 90.

Provision of the lowest temperature water to both the first evaporator section 36 and the heat loads 64 and integrating the water flows 90 and 96 to receive heat from the highest temperature waste maximizes the waste heat recovery from both the lower temperature heat load and the higher temperature core flow.

The example evaporator portions 36, 38 are disclosed and illustrated as separate components, however, both portions could be configured as different passes through a single unit with separate water heating circuits.

In one disclosed embodiment, a portion of the water flow is provided upstream to the compressor section 24 for intercooling. An intercooling flow of water 76 provides for improved compressor performance. Moreover, although intercooling of the compressor section 24 is shown and disclosed by way of example, the flow of water 76 could be utilized for other engine cooling functions.

Figure 3:
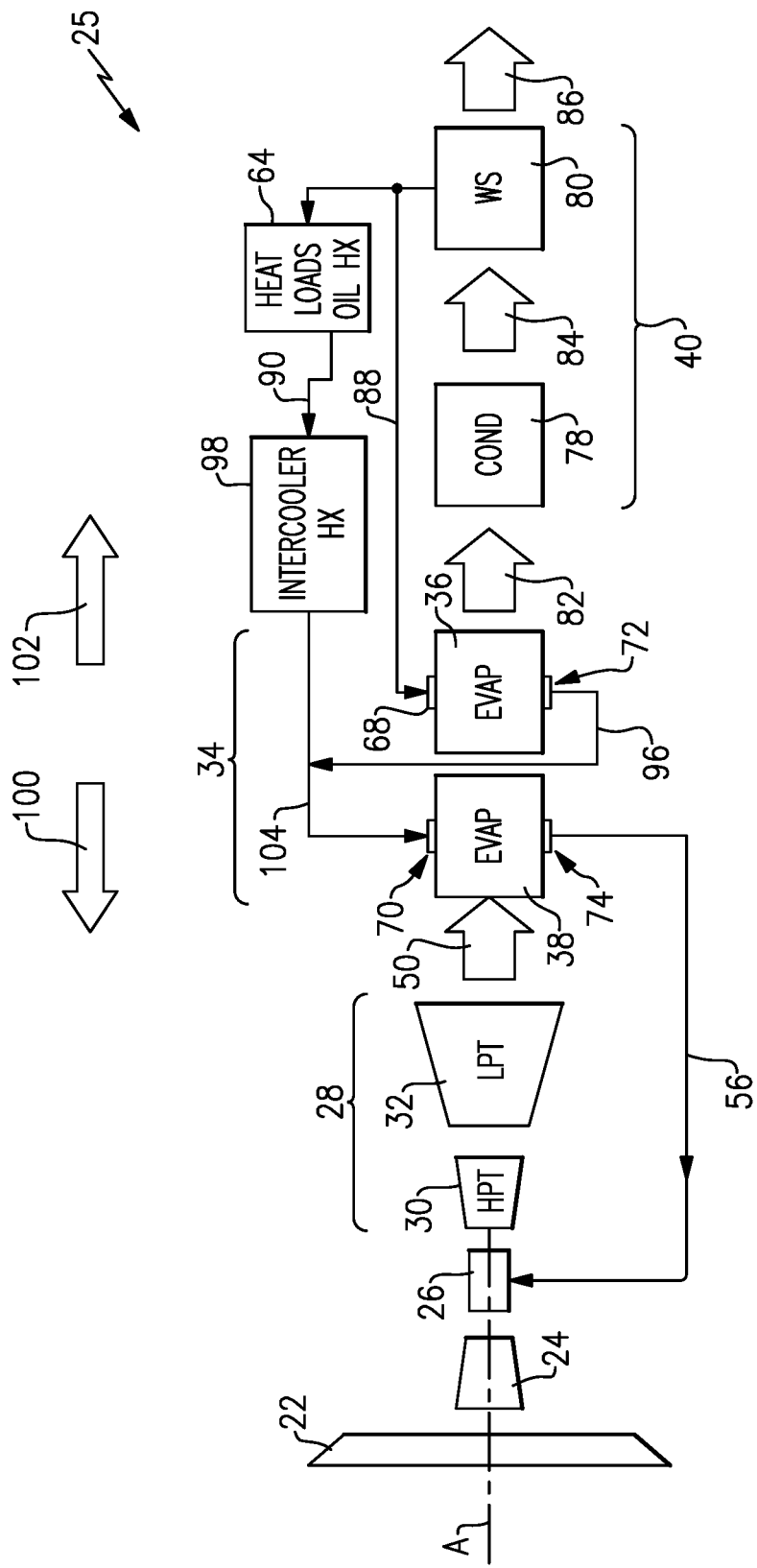
FIG. 3 is a schematic view of yet another example propulsion system embodiment.

Referring to FIG. 3, another disclosed example engine embodiment is shown and indicated at 25 and includes an intercooling heat exchanger 98 that receives a water flow 90 from the heat load 64. The intercooler heat exchanger 98 may provide cooling for any heat load on the engine or aircraft, such as a heat load from cooling air passing from one stage of compression to a higher pressure stage of compression. The intercooler heat exchanger 98 may provide cooling for a cooled cooling air system, a compressor intercooling system, cooling of a lubrication system or any other system or component that operates better when cooled. A combined water flow indicated at 104, includes preheated water from the first evaporator 36, from the heat load 64 and from the intercooler heat exchanger 98. The preheating of the combined water flow 104 enables a greater amount of steam generation than if all the thermal energy required for transformation was provided only by the second evaporator 38.

Figure 4:
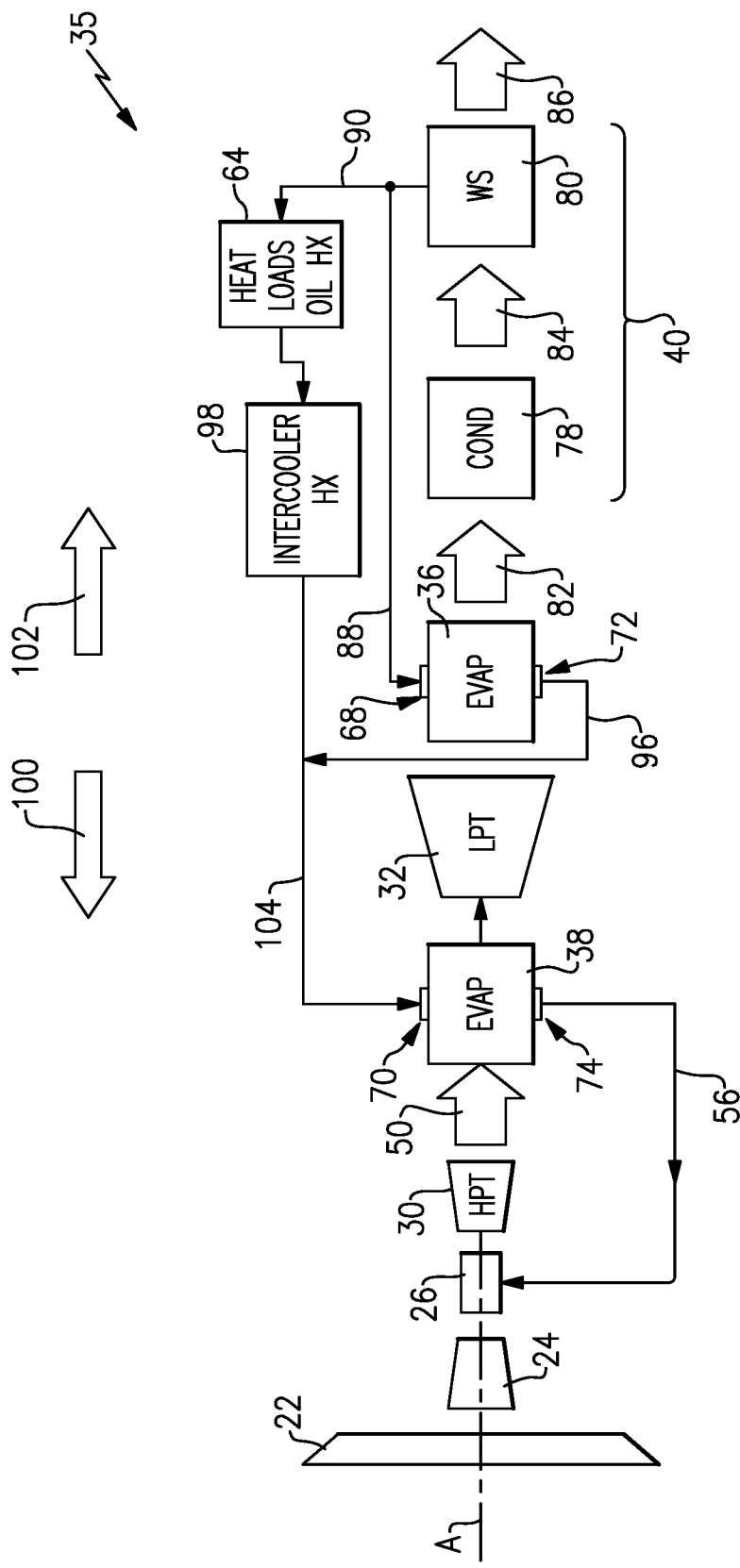
FIG. 4 is a schematic view of still yet another example propulsion system embodiment.

Referring to FIG. 4, another disclosed example engine embodiment is shown and indicated at 35 and includes the second evaporator 38 disposed between turbine sections 30 and 32. The second evaporator 38 is disposed between the high pressure turbine section 30 and the low pressure turbine section 32. The exhaust gas flow 50 communicated to the second evaporator portion 38 is therefore much hotter than the gas flow exhausted from the low pressure turbine section 32. The higher temperature gas flow 50 further improves the generation and superheating temperature of the steam flow 56. The first evaporator portion 36 is disposed aft and downstream of the last turbine section 32.

Although the disclosed example embodiment shows the second evaporator portion 38 disposed between the high pressure turbine 30 and the low pressure turbine 32, the second evaporator 38 may be located anywhere within the turbine section 28 upstream of at least one turbine section. Moreover, the first evaporator portion 36 may be disposed anywhere aft of a last portion of the turbine section 28.

Accordingly, the disclosed evaporator assemblies provide improved heating and cooling functions by providing separate portions that can be individually tailored to maximize steam generation and exhaust gas cooling.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
 a core engine including a core flow path where air is compressed in a compressor section, communicated to a combustor section, mixed with fuel, and ignited to generate an exhaust gas flow that is expanded through a turbine section, wherein the turbine section includes a first turbine and a second turbine;
 a condenser assembly arranged along the core flow path to extract water from the exhaust gas flow; and
 an evaporator assembly where thermal energy from the exhaust gas flow is communicated to the water extracted by the condenser assembly to generate a steam flow for injection into the core flow path, the evaporator assembly having a first inlet for a first flow of water and a second inlet for a second flow of water upstream of the first inlet, wherein the evaporator assembly comprises a first evaporator assembly that is disposed between the first turbine and the second turbine and a second evaporator assembly that is disposed after the second turbine.

2. The turbine engine assembly as recited in claim 1, wherein a spacing between a last stage of the turbine section and the first inlet is greater than a spacing between the last stage of the turbine section and the second inlet.

3. The turbine engine assembly as recited in claim 1, wherein the evaporator includes a first outlet and a second outlet, wherein the second outlet is upstream of the first outlet and a flow of water from the first outlet is combined with the second flow of water communicated to the second inlet.

4. The turbine engine assembly as recited in claim 1, including at least one heat load upstream of a flow of water from the second inlet where the second water flow is preheated before entering the evaporator assembly.

5. The turbine engine assembly as recited in claim 4, including an intercooler upstream of the second inlet where the preheated second water flow is cooled prior to entering the evaporator assembly.

6. The engine assembly as recited in claim 1, wherein the second flow of water into the evaporator is at a higher temperature than the first inlet flow of water in the evaporator.

7. The engine assembly as recited in claim 1, where the steam temperature exiting the evaporator assembly is between 550 and 1500 F.

8. The turbine engine assembly as recited in claim 1, wherein the condenser assembly includes a condenser portion where water from the exhaust gas flow is condensed into a liquid and a water separator where the liquid is separated from the exhaust gas flow.

9. The turbine engine assembly as recited in claim 1, wherein at least a portion of water extracted by the condenser assembly is communicated to a location upstream of the combustor.

10. The turbine engine assembly as recited in claim 1, wherein at least a portion of the steam flow is injected into the combustor section.

11. The turbine engine assembly as recited in claim 1, including a hydrogen fuel system supplying hydrogen fuel to the combustor through a fuel flow path.

12. A turbine engine comprising:
a core engine including a core flow path where air is compressed in a compressor section, communicated to a combustor section, mixed with fuel, and ignited to generate an exhaust gas flow that is expanded through a turbine section, wherein the turbine section comprises at least a first turbine and a second turbine;
a hydrogen fuel system suppling hydrogen fuel to the combustor through a fuel flow path;
a condenser assembly arranged along a core flow path to extract water from the exhaust flow; and
an evaporator assembly where thermal energy from the exhaust gas flow is communicated to the water extracted by the condenser assembly to generate a steam flow for injection into the core flow path, the evaporator assembly including a first water heating circuit for heating a first water flow and a second water heating circuit for transforming a second water flow into a steam flow, wherein the evaporator assembly comprises a first evaporator portion disposed aft of the turbine section and a second evaporator portion disposed between the first turbine and the second turbine, and the second water heating circuit is disposed in the second evaporator portion and the first water circuit is disposed in the first evaporator portion.

13. The turbine engine assembly as recited in claim 12, wherein the first water heating circuit is located downstream further from the combustor than the second water circuit.

14. The turbine engine assembly as recited in claim 12, including at least one heat load where a second water flow is preheated before entering the second heating circuit of the evaporator assembly.

15. A method of generating a steam flow in a turbine engine assembly, the method comprising:
extracting water from an exhaust gas flow;
communicating a first flow of the extracted water to a first heating circuit of an evaporator exposed to the exhaust gas flow aft of a turbine section;
communicating a second flow of the extracted water to a second heating circuit of an evaporator exposed to the exhaust gas flow between a first turbine and a second turbine of the turbine section, wherein the second heating circuit is in a hotter portion of the exhaust gas flow;
directing heated water flow from the first heating circuit into the second heating circuit;
heating the water flow in the second heating circuit to generate a steam flow; and
communicating the generated steam flow to a core flow path of the turbine engine.

16. The method as recited in claim 15, wherein the first flow in the first circuit generates steam and the second heating circuit generates a superheated steam flow.

17. The method as recited in claim 15, including heating the second flow of extracted water with at least one heat load to preheat the second flow prior to entering the evaporator.

* * * * *